June 12, 1951 — E. D. WILLIAMS — 2,556,668

PORT SEALING UNIT FOR VALVE ASSEMBLIES

Filed May 18, 1945 — 2 Sheets-Sheet 1

Inventor
Eugene D. Williams
By Mason, Porter & Diller
Attorneys

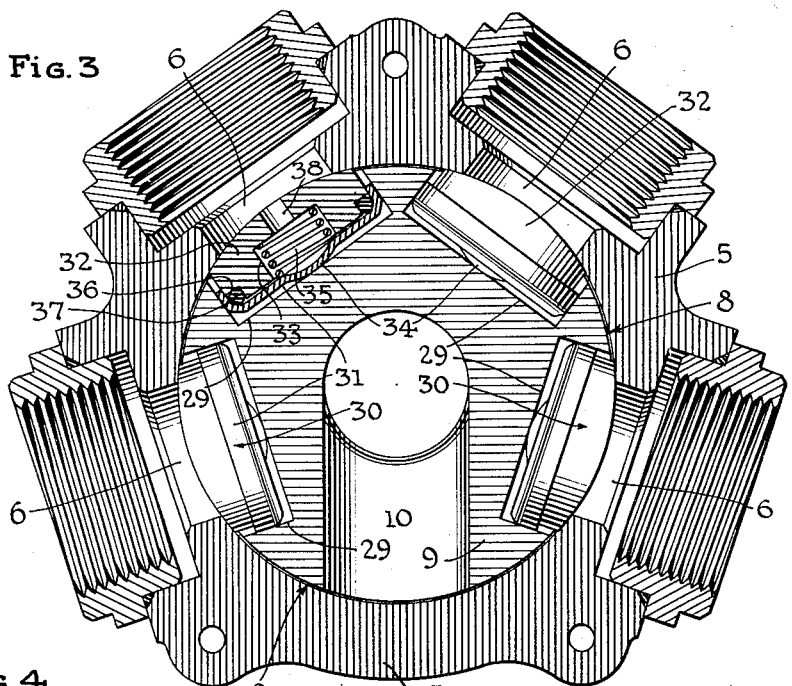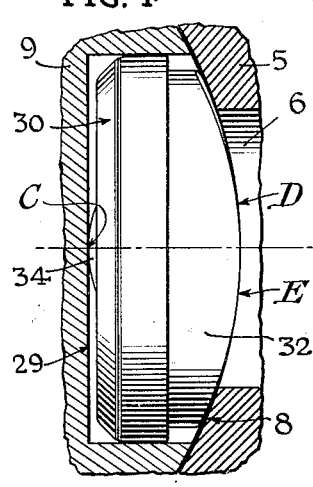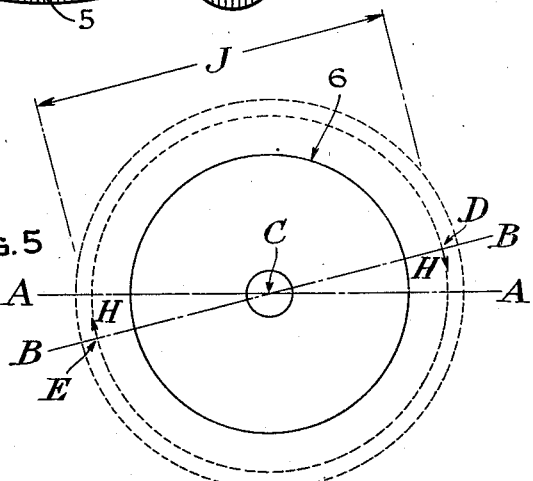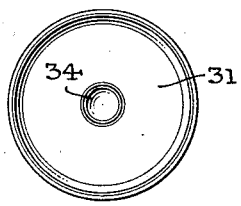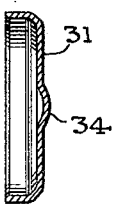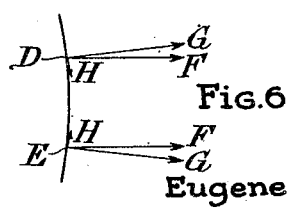

Patented June 12, 1951

2,556,668

UNITED STATES PATENT OFFICE 2,556,668

PORT SEALING UNIT FOR VALVE ASSEMBLIES

Eugene D. Williams, Cleveland, Ohio, assignor to The Parker Appliance Company, Cleveland, Ohio, a corporation of Ohio Application May 18, 1945, Serial No. 594,491

3 Claims. (Cl. 251—105)

The invention relates generally to valve assemblies, and more particularly to valve assemblies embodying a casing having a plurality of inlet ports and a single outlet port through which fluid is to be discharged from a selected inlet port, or a plurality of outlet ports and a single inlet port from which liquid is to be distributed to a selected outlet port, and a rotor for controlling the flow of fluid through said ports, and it primarily seeks to provide in such valve assemblies novel self aligning port sealing units movable with the rotor and engageable over ports intended to be closed for effectively sealing said ports.

Valve assemblies of the character stated embodying port sealing units have been provided heretofore, and in these assemblies the sealing units were mounted in receiving recesses from which the outer or sealing faces of the units projected for contact with the curved face portions against which they were intended to engage. It has been found, however, that in many cases leakages occurred between the sealing unit faces and the surfaces contacted thereby, and great difficulty was experienced in determining why such leakages should occur despite the fact that sealing faces of the units were properly shaped for accurate sealing contact with said surfaces. Finally, it was determined that leakage through a valve having perfect parts was due to the slightly twisted position of a sealing unit in its receiving recess whereby the curved outer or sealing surface was displaced out of position for engaging in snug sealing contact with the opposing cooperating surface throughout the whole area of said unit surface. Each said sealing unit presented a relatively large surface area in contact with the bottom of its receiving recess, and because of the friction incidental to this large area contact the units were incapable of moving with sufficient freedom to effect self alignment in their recesses. It is the purpose of the present invention to provide novel sealing units and mountings therefor which will enable the units to partake of self aligning movement should they be placed improperly in their receiving recesses.

An object of the invention is to provide in a valve assembly of the character stated a sealing unit and a mounting therefor providing anti-friction contact between the sealing unit and the bottom of the recess in which it is mounted, thereby to minimize frictional contact of the unit in its receiving recess and make the unit free to partake of self aligning movement in the recess.

Another object of the invention is to provide a novel sealing unit of the character stated including a curved sealing surface at one face thereof and being equipped with a projection at its other face presented for anti-friction, substantially point contact with the bottom of the recess in which the unit is mounted.

Another object of the invention is to provide a novel sealing unit of the character stated which is composed of two parts and having a compression spring between and constantly tending to separate said parts, one said part having a curved sealing surface, and the other of said parts being equipped with a projection presented for anti-friction, substantially point contact with the bottom of the recess in which the unit is mounted.

Another object of the invention is to provide a sealing unit of the character stated including a cup-like shell having a protuberance presented for engaging in substantially point contact in a unit receiving recess, a sealing disk slidably telescoped in and projecting from the shell and having a curved sealing surface at the face thereof projected from the shell and an aperture extending through said surface and into a space between the disk and shell, and a compression spring between the disk and shell and constantly tending to force the disk out of the shell.

With the above and other objects in view that will hereinafter appear, the nature of the invention will be more clearly understood by reference to the following detailed description, the appended claims, and the several views illustrated in the accompanying drawings.

In the drawings:

Figure 3 is a horizontal section through the valve structure, the section being taken in the plane in which the centers of the sealing units lie.

Figure 4 is an enlarged fragmentary sectional view illustrating a sealing unit improperly mounted in twisted relation in its receiving recess.

Figure 5 is a diagrammatic face view illustrating the twisted position of the sealing unit shown in Figure 4.

Figure 6 is a diagrammatic view illustrating the manner in which the action of the compression spring in the sealing unit aids the self aligning of the unit in its receiving recess.

Figure 7 is a detail vertical cross section illustrating the shell of a sealing unit.

Figure 8 is a face view of the shell shown in Figure 7.

Figure 1:
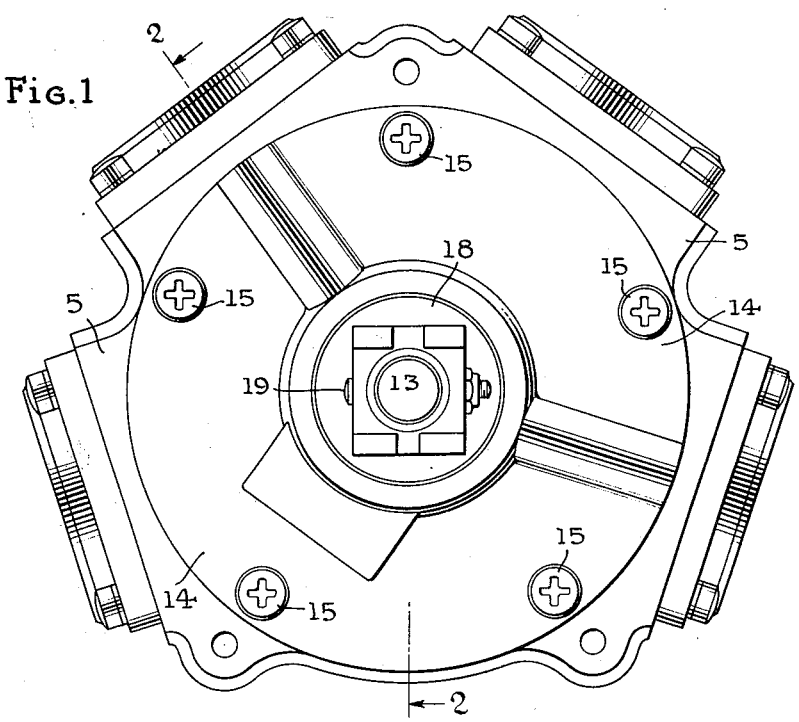
Figure 1 is a plan view of a valve structure embodying the invention.

In the example of embodiment of the invention illustrated in the drawings, the valve structure includes a casing 5 which has a plurality of inlet ports 6 arranged in the same horizontal plane, and a single outlet port 7 arranged in right angular relation to and centrally between the ports 6. The casing also is equipped with a cylindrical rotor receiving bore 8 in which is rotatably mounted a cylindrical rotor 9 having elbow passage 10, one leg of which constantly registers with the port 7, and the other leg of which is selectively presentable in registry with the several ports 6, or turned to the position illustrated in Figures 2 and 3 to completely close off communication through the valve structure.

With the ports arranged in the manner stated, it is possible, by proper manipulation of the valve rotor, to receive fluid from a selected one of the ports 6 and deliver it through the port 7, or to close off flow communication through the valve structure entirely as before stated. It is to be understood however that the port 7 may be employed as an inlet port, in which case the rotor may be properly manipulated to deliver fluid from the port 7 through a selected one of the ports 6.

Figure 2:
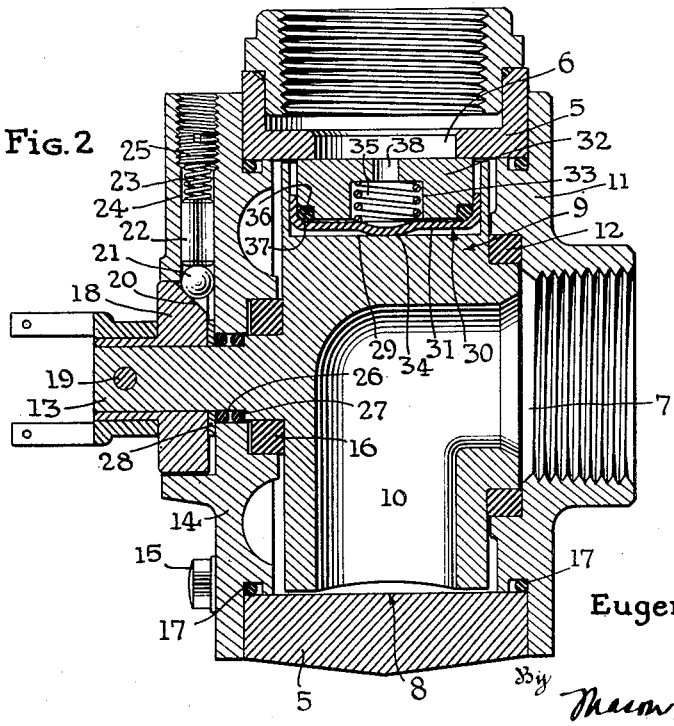
Figure 2 is a vertical cross section taken on the line 2—2 on Figure 1.

The outlet port 7 preferably is formed in a casing bore end closure plate 11 which is secured by screws to the casing over one end of the rotor bore in the manner illustrated in Figure 2. The rotor is equipped with a non-metallic bearing ring 12 which engages the end closure plate in the manner clearly illustrated in Figure 2. At its other end the rotor is equipped with an actuator stem 13 which projects through a bore in an end closure ring 14, the latter being screw secured to the casing as at 15. See Figures 1 and 2. The rotor also has a non-metallic bearing ring 16 positioned for engagement with the closure ring. It will be apparent that the bearing rings 12 and 16 may be movable with the rotor, or they may be stationarily mounted in recesses formed in the end plate and ring respectively and rotatably engaged by the rotor. The plate 11 and the ring 14 are grooved to receive packing rings 17 which serve to seal the valve rotor chamber against leakage of fluid.

It will be apparent by reference to Figures 1 and 2 that an indexing collar 18 is pin secured as at 19 on the actuator stem 13, and said collar is equipped with a suitable number of spaced peripheral notches 20 adapted to engage with detent means effective to yieldably retain the rotor with its flow passage in proper registry with a selected one of the ports 6 or in the flow communication cutoff position illustrated in Figures 2 and 3. The indexing means forms no part of the present invention, and it is to be understood that any suitable indexing means may be employed. In this disclosure the indexing means, in each instance, comprises a detent ball 21 engaged by a plunger 22 which is acted on by a follower spring 23, all disposed in a radial bore 24 closed by an adjustably mounted closure plug 25.

The actuator stem 13 is reduced in diameter as at 26 within the closure ring 14 to provide a chamber wherein are mounted packing rings 27 retained in position by the retainer ring 28.

The rotor has its external cylindrical surface provided with four sealing unit receiving recesses 29 arranged in a common plane and so spaced as to be simultaneously placeable in registry with the four casing ports 6 in the manner clearly illustrated in Figure 3 of the drawings.

The structures hereinabove described comprise conventional valve structures and the present invention resides in the novel construction and manner of mounting of the sealing units which are removably and replaceably mounted in the rotor recesses 29.

The sealing units are generally designated 30 and each comprise an imperforate cup-like shell 31 which is shallower than the depth of the recess 29 in which it is mounted, and a non-metallic sealing disk 32 which is slidably telescoped in said shell. It will be obvious by reference to Figures 2 and 3 that each disk 32 has its outer or sealing surface curved to conform to the internal curvature of the rotor bore 8, and it is intended that each such sealing surface should constantly engage in snug sliding contact with the rotor bore throughout the whole area thereof opposed by said disk. Each sealing disk is provided at its inner face with a centrally disposed pressure chamber forming recess 33, and it will also be apparent by reference to Figures 2, 3, 4, 7 and 8 that each shell 31 is provided with a centrally disposed protuberance or hump 34 adapted to engage in substantially point contact as at C with the bottom of the recess 29 in which the particular sealing unit is mounted. A compression spring 35 is mounted in each pressure chamber recess 33 and constantly presses the outer, curved surface of the sealing disk 32 against the rotor bore wall and the respective protuberance 34 against the receiving recess bottom.

It will be apparent that each disk is of a thickness slightly less than the distance of the bottom of the respective shell 31 from the opposing wall portion of the rotor bore in the casing so that when the external surface of the disk 32 is in engagement with said opposing wall portion, the inner face of the disk will be spaced slightly from the bottom of the respective shell in the manner clearly illustrated in Figure 3.

Each disk 32 also is equipped with an annular peripheral recess 36, and a gasket ring 37 is mounted in each recess 36 and engages the inner wall of the respective shell 31 in a manner for sealing the shell and disk against fluid leakage from the chamber 33 into the space surrounding the disk within the rotor recess in which it is mounted.

It will be obvious by reference to Figures 2 and 3 of the drawings that by turning the rotor the valve may be completely shut off in the manner illustrated in said figures, or the elbow passage 10 in the rotor can be presented for connecting a selected one of the inlet ports 6 with the outlet port 7 for delivery of fluid therethrough, and as previously stated the indexing means will serve to yieldably retain the rotor in any of its adjusted positions.

Each sealing disk is apertured as at 38 to admit port pressure into the chamber 33 of the particular unit.

The sealing unit structure herein disclosed is generally similar to the sealing unit covered in U. S. Letters Patent 2,371,657 issued to Donald A. Stark on March 20, 1945 with the exception of the provision of the shell protuberance 34, and the sealing disks are subject to being tightly seated by fluid pressure entering through the radially projected casing ports in the manner described in said patent, but it is to be understood that the present invention is not limited to this exact form of sealing means and is broad enough to comprehend single piece sealing units or sealing units comprising a multiple of parts and functioning for the same general purpose although constructed in detail in a manner differentiating from the disclosure in the previously mentioned patent.

In Figure 4 of the drawings, there is illustrated a single sealing unit which is improperly mounted in its receiving recess. It will be noted that this unit is twisted about its center so that its curved sealing surface does not properly engage the surface of the rotor bore which it opposes throughout the whole area opposed thereby. This twisted or displaced arrangement of the sealing unit, which is objectionable because it will permit leakage between the sealing unit and the casing despite the fact that the component parts of the sealing unit are accurately constructed, is diagrammatically illustrated in Figure 5. In this figure A—A represents the axis of the casing bore, and B—B represents the axis of the curved face of the sealing disk. When the unit is mounted askew as in Figure 4, it will be apparent that the shell protuberance will engage in point contact at C at the bottom of the receiving recess as is intended, but the outer curved sealing surface of the sealing disk will not properly engage throughout the whole area thereof with the opposing portion of the rotor bore but will engage said bore at two points only, namely as designated D and E in Figures 4 and 5.

In conventional structures wherein the inner face of the shell 31 engages the receiving recess in the rotor over a large area thereof, the resistance set up by this frictional contact is sufficient to prevent self alignment of the sealing unit in the casing bore, but in the improved structure herein disclosed, the point contact of the shell with the bottom of the recess as at C presents substantially zero frictional resistance and leaves the unit free to partake of self aligning movement in the recess. Therefore, when the compression spring 35 within the unit exerts its distending force tending to separate the disk and shell, and as indicated diagrammatically at F in Figure 6, this distending force F against the two points D and E as shown in Figures 4, 5 and 6 produces two normal forces G against the casing bore and two tangential forces H as shown in Figures 5 and 6. These tangential forces are opposite in direction and act through the distance J (the diameter of the disk) to produce a couple H x J which tends to rotate the sealing unit so as to bring the axes A—A and B—B into alignment. The only forces resisting this self alignment movement are the infinitesimally small couple at C, which is for all practical purposes equal to zero, and the negligible friction couple resulting from the normal forces indicated at G. In the valve assembly herein disclosed, when a sealing unit is placed askew in its receiving recess as indicated in Figure 4, and diagrammatically in Figure 5, substantially zero friction will be provided at C, D, and E, and these frictional contacts are not sufficient to prevent proper self alignment of the outer sealing surface of the disk and the portion of the rotor bore opposed thereby.

While one form of the invention has been shown for purposes of illustration, it is to be clearly understood that various changes in the details of construction and arrangement of parts may be made without departing from the spirit and scope of the invention as defined in the appended claims.

I claim:

1. In a valve structure, a casing having a cylindrical rotor bore and a port communicating with said bore, a cylindrical rotor rotatable in said bore and having a flow passage therein movable into or out of communication with said port, said rotor having a cylindrical recess extending radially through its periphery and terminating inwardly in a bottom having a flat central portion disposed in perpendicular relation to the radial axis of the recess, and a sealing unit mounted in said recess and placeable over said port for sealing the same when the rotor is turned to move its flow passage out of communication with the port, said sealing unit having an outer face curved to conform in shape to and snugly engage in sealing contact throughout the whole area of the cylindrical bore portion opposed thereby and having at its inner face a protuberance engaging in substantially point contact only with said bottom portion of the recess at the center of the recess, thereby to offer substantially no resistance to movement of the unit in the recess in a direction for self aligning said outer face with the cylindrical bore portion opposed thereby.

2. Valve structure as defined in claim 1 in which the sealing unit includes two parts one bearing the curved outer face and the other the protuberance, and a compression spring between said unit parts and effective to constantly tend to press the protuberance against the recess bottom and the curved outer face against the portion of the cylindrical bore opposed thereby.

3. In a valve structure, a casing having a cylindrical rotor bore and a port communicating with said bore, a cylindrical rotor rotatable in said bore and having a flow passage therein movable into or out of communication with said port, said rotor having a cylindrical recess extending radially through its periphery and terminating inwardly in a bottom wall portion disposed in perpendicular relation to the radial axis of the recess, and a sealing unit mounted in said recess and placeable over said port for sealing the same when the rotor is turned to move its flow passage out of communication with the port, said sealing unit having an outer face curved to conform in shape to and snugly engage in sealing contact throughout the whole area of the cylindrical bore portion opposed thereby and having an inner wall portion opposed to the recess bottom wall portion, one said wall portion including a flat central area and the other of said wall portions having a protuberance engageable in point contact with said flat central area at the radial axis of the recess, thereby to offer substantially no resistance to movement of the unit in the recess in a direction for self-aligning said outer face with the cylindrical bore portion opposed thereby, said sealing unit including two parts one bearing the curved outer face and the other the said inner wall portion, and a compression spring between said unit parts and effective to constantly tend to hold the protuberance and said flat central area together and to press the curved outer face against the portion of the cylindrical bore opposed thereby.

EUGENE D. WILLIAMS.

REFERENCES CITED

The following references are of record in the file of this patent:

UNITED STATES PATENTS

| Number | Name | Date |
|---|---|---|
| 1,949,834 | Heggem | Mar. 6, 1934 |
| 2,209,136 | Parker | July 23, 1940 |
| 2,371,657 | Stark | Mar. 20, 1945 |

FOREIGN PATENTS

| Number | Country | Date |
|---|---|---|
| 399,092 | Germany | July 19, 1924 |